(12) United States Patent
Ryan et al.

(10) Patent No.: US 7,921,019 B2
(45) Date of Patent: Apr. 5, 2011

(54) UNIQUE IDENTITY TRADING CHARMS FOR A SECURE CONTROLLED INTERNET COMMUNICATION SYSTEM

(76) Inventors: Melinda D. Ryan, Sapulpa, OK (US); Shawna D. Sims, Sapulpa, OK (US); Lori D. Henson, Sapulpa, OK (US)

(*) Notice: Subject to any disclaimer, the term of this patent is extended or adjusted under 35 U.S.C. 154(b) by 339 days.

(21) Appl. No.: 12/319,530

(22) Filed: Jan. 8, 2009

(65) Prior Publication Data
US 2010/0144429 A1 Jun. 10, 2010

Related U.S. Application Data

(60) Provisional application No. 61/133,722, filed on Jul. 1, 2008, now abandoned.

(51) Int. Cl.
*G06Q 99/00* (2006.01)
(52) U.S. Cl. .......................................... 705/1.1; 705/64
(58) Field of Classification Search .................. None
See application file for complete search history.

(56) References Cited

U.S. PATENT DOCUMENTS

| | | | |
|---|---|---|---|
| 6,568,455 B2 | 5/2003 | Zieverink | |
| 6,591,252 B1 | 7/2003 | Young | |
| 7,425,169 B2 | 9/2008 | Ganz | |
| 7,442,108 B2 | 10/2008 | Ganz | |
| 2007/0197297 A1 | 8/2007 | Witchey | |
| 2008/0005557 A1 | 1/2008 | Chester | |
| 2008/0009345 A1 | 1/2008 | Bailey | |
| 2008/0009350 A1 | 1/2008 | Ganz | |
| 2008/0009351 A1 | 1/2008 | Ganz | |
| 2008/0026666 A1 | 1/2008 | Ganz | |
| 2008/0040230 A1 | 2/2008 | Ganz | |
| 2008/0040297 A1 | 2/2008 | Ganz | |

FOREIGN PATENT DOCUMENTS
WO WO/2006/014722 9/2006

OTHER PUBLICATIONS

Disney Launches Fairies World and Toys; New Team Focus on Virtual Worlds. Virtual World News, Feb. 19, 2008; www.virtualworldsnews.com/2008/02/disney-launches.html.

*Primary Examiner* — Andrew J. Fischer
*Assistant Examiner* — Jacob C. Coppola
(74) *Attorney, Agent, or Firm* — Randal D. Homburg

(57) ABSTRACT

A method and product for the establishment and continued use of a secure online communication network between known and intentional acquaintances utilizing unique individual encoded exchanged objects, purchased by a purchaser and given to individuals known by the consumer, comprising a key object used to establish a closed network by the purchaser or host, and a plurality of exchanged token objects given to members or friends to whom an offer to join the closed network is extended, each exchanged token object containing a unique code required to log into the closed network, wherein communication may be held between the host and their friends without intrusion by persons outside the closed network.

12 Claims, 2 Drawing Sheets

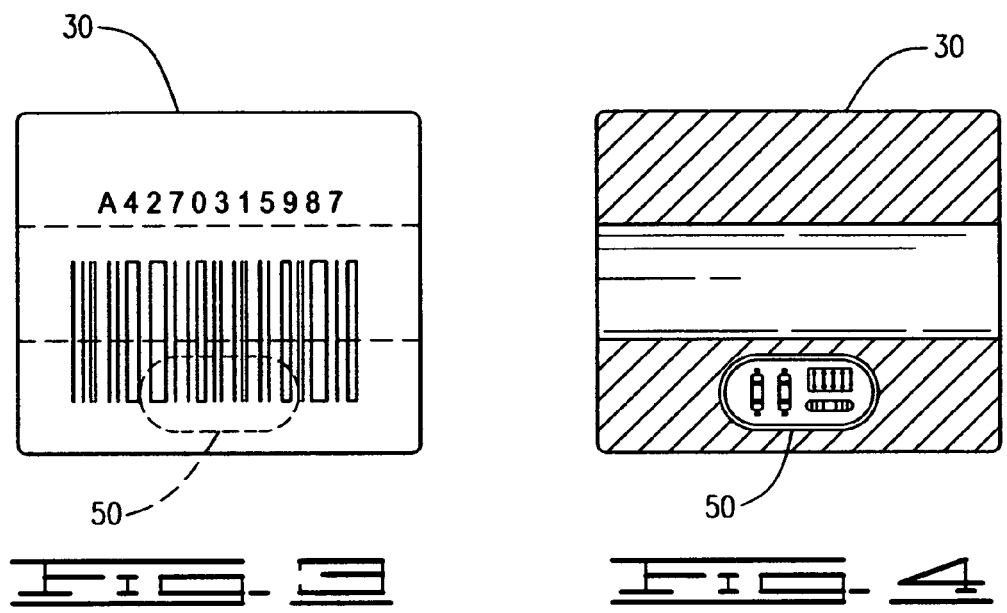
FIG-3
FIG-4
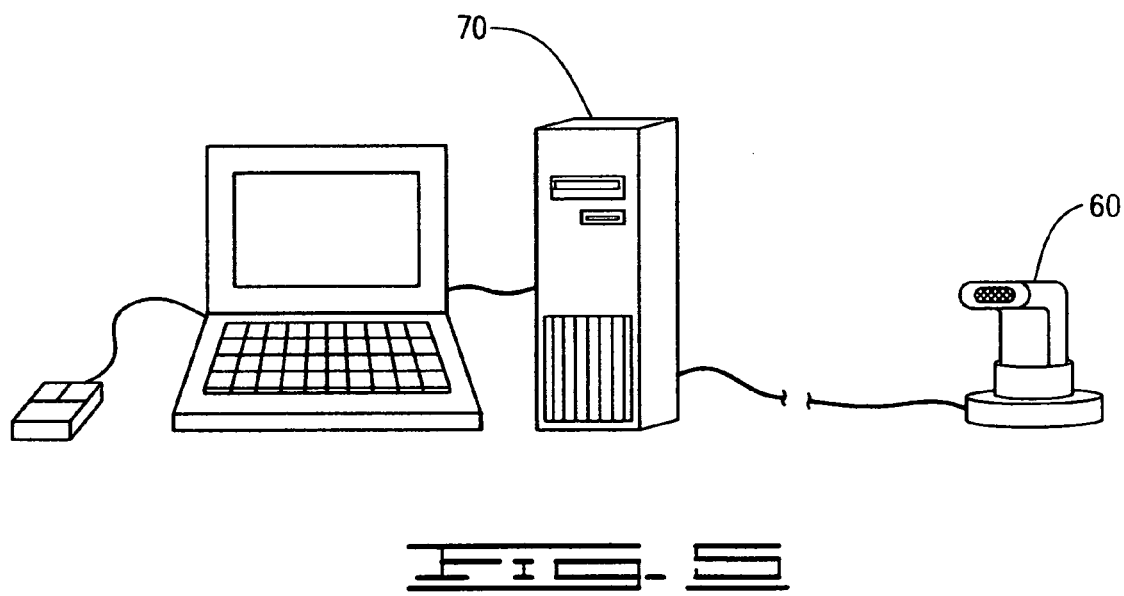
FIG-5

UNIQUE IDENTITY TRADING CHARMS FOR A SECURE CONTROLLED INTERNET COMMUNICATION SYSTEM

CROSS REFERENCE TO RELATED APPLICATIONS

Applicants claim the benefit of Provisional Patent No. 61/133,722, filed on Jul. 1, 2008.

BACKGROUND OF THE INVENTION

1. Field of Invention

A method and product for the establishment and continued use of a secure online communication network between known and intentional acquaintances utilizing unique individual encoded exchanged objects, purchased by a purchaser and given to individuals known by the consumer, comprising a key object used to establish a closed network by the purchaser or host, and a plurality of exchanged token objects given to members or friends to whom an offer to join the closed network is extended, each exchanged token object containing a unique code required to log into the closed network, wherein communication may be held between the host and their friends without intrusion by persons outside the closed network.

2. Description of Prior Art

The following United States patents are identified and disclosed herein. Several devices are disclosed relating to Internet communication systems and exchanged trinkets.

A product on the market named WEBKINZ® charms distributes and sells collectible charms. The charms bear a unique feature code that allows registration on line to allow the bearer to travel deeper into a magical Charm Forest, as well as to receive a virtual version of the charm online. The user must have previously purchased a WEBKINZ® pet and be pre-registered to register the charms online. Children are encouraged to purchase as many charms as possible. These charms may also be purchased online as well as at a retail outlet. See, U.S. Pat. No. 7,442,108 and 7,425,169 to Ganz.

Disney® has a product introduced at the 2008 Toy Fair known as Clickables. Some time ago, Disney launched a website, DisneyFairies.com, that allowed children, primarily young girls, to create "fairy aviators" and interact with an online world. The new technology that meets with this system features a magic jewelry box connecting to a computer through a USB port, which should have charm bracelets and charms. If you touch a charm to a friend's charm and push a "friend" button, each "avatar" becomes a friend in the online world and can communicate as friends the next time the bracelet is placed in the avatars' jewelry box at home. Charm bracelets can be purchased with or without the friend buttons. No literature or documentation is available for disclosure or reference, but this product is known in the art.

A system and method for toy adoption marketing encouraging the computer user to adopt an online pet in a virtual world is disclosed in U.S. Patent Publication Application Nos. 2008/0009350, 2008/0009351, 2008/0026666, 2008/0040230 and 2008/0040297 to Ganz. (WEBKINZ® above). A gaming system with authentication tokens, disclosed in U.S. Patent Application No. 2008/0009345 to Bailey, requires a participant to have a one time authentication token used to obtain permission to perform a certain action within the gaming sequence.

In U.S. Patent Application No. 2007/0197297 to Witchey, a system, apparatus and methods detail a system utilizing a trading card with value in a viral world ascribes purchasing power or attributes having offensive, defensive, opportunity or set values as internal gaming values, similar to currency. Control objects in the form of secured bracelets, wrist watches and collars are used as communication objects to verify the eligibility of a player attempting to participate in gaming events, as disclosed in WIPO Application No. WO/2006/014722 to Benbrahim, wherein removal of the control object breaks an electrical circuit completed by the control object, the removal resulting in the elimination of the person wearing the control object from further participation.

In U.S. Pat. No. 6,591,252 to Young, a method and apparatus for authenticating, archiving information and updating ownership of unique items using a unique identification code with an item locks ownership history with a PIN number of the owner and cannot be changed until the owner releases the PIN, after which a new owner associates the item with the new owners PIN. A similar method of authenticating ownership of an object is disclosed in U.S. Patent Application No. 2008/0005557 to Chester.

Individually or in combination, the above prior art patents do not disclose the same method of establishing and maintaining a secure network communication in the same manner as the present disclosed method, nor do they use the same product components as disclosed within the present method to accomplish the method.

SUMMARY OF THE INVENTION

Safe communication among children is of real concerns for those parents who allow their children to venture into the world of online communication. It is difficult to distinguish between harmless communication and attempts by adult predators to lure children into communication which can lead to harmful activities and dangerous subsequent conduct This concern is over an epidemic of sick and twisted sexual deviates and perverts who prey on innocent children, and is a very real and justifiable concern.

Secured means is especially of concern since new media have been introduced to the Internet over the last few years, including MySpace, and other Internet profiles which can contain personal information. These are supposed to have security measures to reduce the potential of online predators, but means of bypassing these security measures have been derived and posted online as fast a new measures are put into place.

As parents, a preferred controlled network to monitor those who our children and young people, or that we as adults would use to communicate with online acquaintances, is a solution to these concerns, or at least a solution to communication with those whom we have not met in person. By presenting limited exchange of the exchanged token objects in the present apparatus and system, trading of exchanged token objects would preferably consist of face-to-face exchange in closely monitored circumstances, trading online or mailing the exchanged token objects to a confirmed location or address, or trading virtual exchanged token objects online, in order of preference.

Preferred distribution using face-to-face contact is the most secure and preferred, although the distribution would be slowed and restricted to the child local contact pools. This would be best suited for contacts at school, church, day care, camps, youth organizations (Boy Scouts, Cub Scouts, Girls Scouts, Campfire), YMCA or other groups having controlled memberships. It will not eliminate a predator from having contact with children on the computer or ultimately in person, but it will drastically reduce the potential, especially where responsible parenting and vigilance is combined with sound judgment of the parents.

It is therefore the objective of the present method utilizing the controlled objects to provide a secure means of communication by way of the Internet which limits access to a secure network to only those to whom an offer to engage in communication is extended by confirmed code. It is also the objective to provide a direct exchange medium through encoded exchanged objects to grant access to only those who have a personally r ed object to gain access to the secure network.

DESCRIPTION OF THE DRAWINGS

The following drawings are informal drawings submitted with this utility patent application.

FIG. 3 is an embodiment of one exchange token object with an external alphanumerical registration means.

FIG. 4 is a cross-sectional embodiment of one exchange token object with an internal registration means.

FIG. 5 is an embodiment of a registration code reading device attached to a computer and utilized with an internal registration means of the key object and the plurality of exchange token objects.

DESCRIPTION OF THE PREFERRED EMBODIMENT

Figure 1:
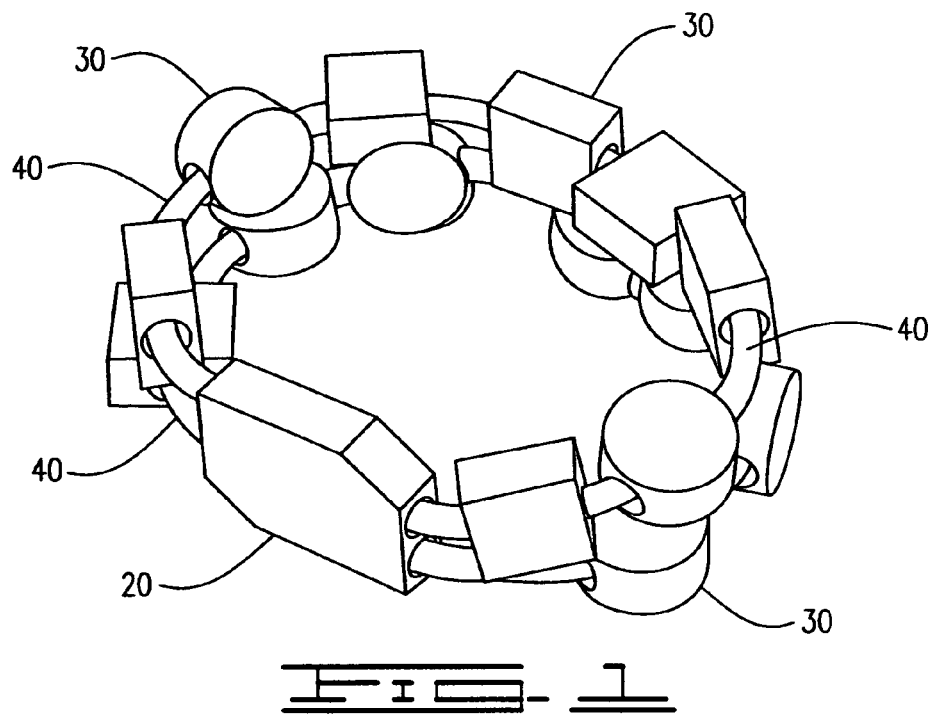
FIG. 1 is an embodiment of a key object and a plurality of exchange token objects on a bracelet
Figure 2:
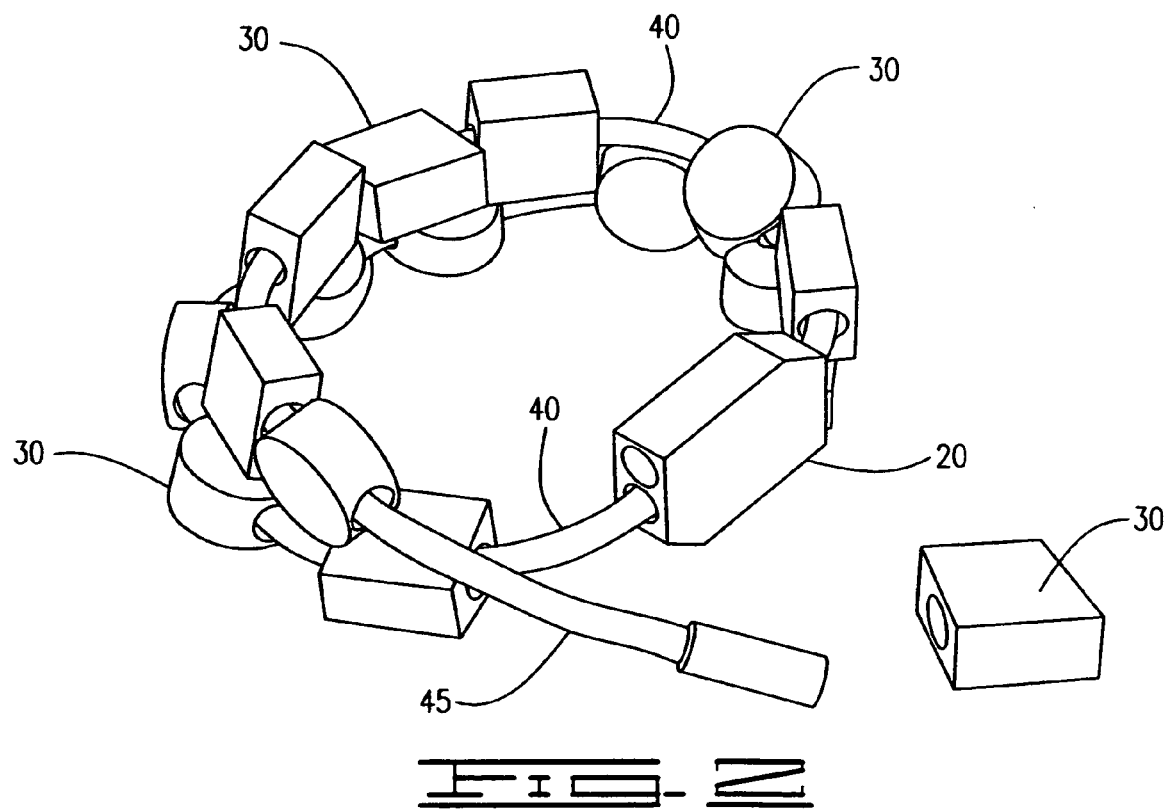
FIG. 2 is the embodiment as shown in FIG. 1 with a bracelet strand detached.

A method and product for the establishment and continued use on a secure online communication network, providing users having computer Internet access to privately restrict communication within the network among known persons, the method and product comprising a unique and individually encoded key object 20 used to establish a closed network by a purchaser or host, a plurality of unique and individual encoded exchanged objects 30 given to members or known acquaintances to whom an offer to join the closed network is extended, and a carrying device 40 to transport the key object 20 and plurality of encoded exchanged objects 30. An embodiment, shown in FIGS. 1-4 of the drawings, indicates the carrying device 40 as a bracelet having at least one detachable strand 45, the key object 20 as the bracelet clasp, and the encoded exchanged objects 30 as charms which are placed upon the at least one detachable strand 45 of the bracelet.

Each encoded key object 20 and plurality of encoded exchanged objects 30 are assigned a unique code, depending on the technology applied. In a first embodiment of one of the plurality of encoded exchanged objects 30, indicated in FIG. 3, a unique and individual alphanumeric code is printed upon or engraved within the encoded exchanged object 30, visible on at least one surface. In a second embodiment of one of the plurality of encoded exchanged objects 30, indicated in FIG. 4, the unique and individual code may be presented as an internal transmitting device 50, such as in internal RFID transmitter, which would be read by a corresponding proximity reader 60, illustrated as an RFID receiver in FIG. 5, attached to a PC or other Internet accessible device 70. The encoded key object 20 may also include the internal transmitting device 50 requiring the same proximity reader 60. It is also anticipated that a bar code printed on the encoded key object 20 and encoded exchanged objects 30 instead of or in addition to the alphanumeric code and used in conjunction with a bar code reader as the proximity reader 60 may also perform the same task as the various coding means disclosed above, the alphanumeric code provided in addition to the bar code for those the host or the known friend or acquaintance who do not have or cannot afford a proximity reader. While FIGS. 1-5 of the drawings are presented as potential embodiments of the key object 20, the plurality of encoded exchanged objects 30, the carrying device 40 and the proximity reader 60, nothing by means of the drawings is intended to limit the scope of how they should actual be presented By example, the key object 20 may be presented as the bracelet clasp, a pin, a card, a game token, a toy item, a ring, a tie tack, a cuff link, a necklace pendant, a wristband, a team sports buttons, or in any form which could provide the unique and individual alphanumeric code or contain the internal transmitting device 50. The encoded exchanged objects 30 may also be presented as the chains, pins, cards, game tokens, same or different toy items, rings, tie tacks, cuff links, necklace pendants, wristbands, team sports buttons or again in any form which could provide the unique and individual alphanumeric code or contain the internal transmitting device 50. The internal transmitting device may also be presented in by such means as may not be disclosed in the existing technology at this time.

Use of the above components provides a method or process comprising the steps including and commencing with the establishment of a secure shared website within which the secure communication exists, requiring restricted registration to access such website. Each host must purchasing a product kit having a key object 20, a plurality of encoded exchanged objects 30, a carrying device 40 and, where necessary, a proximity reader 60. Subsequent to purchase, the host, under adult supervision, would access the established secure website and enter the code upon or within the encoded key object 20. The secure shared website may send notification to the host that an assigned closed network has been established subsequent to the registration of the encoded key object 20 or at a later time in the sequence of the method. The host would then register each of the unique and individual encoded exchanged objects 30 before giving them to a known friend or member of the closed network.

The host would then give the pre-registered encoded exchanged objects 30 to known friends or acquaintances, including classmates, friends, team mates, or family members, again under adult supervision if the host is to be a child or minor. Each known friend or acquaintance, after receiving their encoded exchanged object 30 would take that to their Internet accessible device 70, log onto the closed network website pursuant to instructions from the host, enter a requisite entry code and register their encoded exchanged object 30. The secure shared website may send a confirmation e-mail to the known friend or acquaintance to acknowledge a successful registration and that access to the assigned closed network has been granted. The known friend or acquaintance and the host may then engage in secure communication within the closed network.

Guarded measures should be established and maintained by each host, each known friend or acquaintance and under the direction and supervision of a responsible adult where the host or known friend or acquaintance are children or minors during establishment and use of the closed network communication to ensure that no other person is allowed access to the closed network, which would completely defeat the purpose and intend of the method and object used in the method.

Use of the closed network may be restricted to allow only communication between the host and each individual known friend or acquaintance. In the event that a known friend or acquaintance would like to establish their own closed network or communicate with other friends or acquaintance inside or outside the closed network, they may choose to purchase their own product kit and follow the same steps as disclosed in the method above. The process of entering each encoded key object 20 and encoded exchanged object 30 may be by either manual entry of the alphanumeric code on the respective object or by use of the proximity reader 60 attached to the Internet accessible device 70 which would read the code from the internal transmitting device 50 when proximally placed near the proximity reader 60 when registering each encoded key object 20 or encoded exchanged object 30 by prompt during the initial registration process or during each time the host or known acquaintance or friend logs on to the closed network.

While the invention has been particularly shown and described with reference to a preferred embodiment thereof, it will be understood by those skilled in the art that changes in form and detail may be made therein without departing from the spirit and scope of the invention, nor should the disclosed embodiments serve to limit the scope of the subject matter claimed within, as the embodiment simply are provided to provide example of the components which are used within the disclosed method of establishing and continued use on a secure online communication network.

We claim:

1. A method for the establishment and continued use on a secure online communication website, providing a user having an Internet access device to privately restrict communication within a registered closed network among known persons having an Internet access device, comprising:

establishing a secure online communication website, requiring restricted registration to gain access to said website and entry into a registered closed network;

purchasing a product kit by a user, designated as a host, said product kit including a unique and individually encoded key object, a plurality of unique and individual encoded exchanged objects, and a carrying device to transport said key object and plurality of encoded exchanged objects;

accessing said secure online communication website and said registered closed network on an Internet access device by said host, under adult supervision if the host is a child or minor, and entering a unique and individual code upon or within said encoded key object to activate said registered closed network;

registering each of said unique and individual encoded exchanged objects by entering a unique and individual code upon or within each said encoded exchanged object into said registered closed network;

giving each of said pre-registered encoded exchanged objects to at least one known friend or acquaintance, under adult supervision if the host is a child or minor;

requiring each at least one said known friend or acquaintance, after receiving each said encoded exchanged object, to log onto said closed network on an Internet access device, pursuant to instructions from said host, enter a requisite entry code and register said encoded exchanged object, wherein each said at least one known friend or acquaintance and said host may engage in secure communication within said registered closed network.

2. The method, as disclosed in claim 1, said encoded key object and said encoded exchanged objects are provided with a unique and individual alphanumeric code imprinted or engraved upon at least one surface.

3. The method, as disclosed in claim 1, said encoded key object and said encoded exchanged objects are provided with a unique and individual bar code imprinted or engraved upon at least one surface and said method employs the use of a proximity reader attached to an Internet accessible device to read said bar codes to enter said unique and individual bar code when registering said encoded key objects and said encoded exchanged objects by said host and said known friend or acquaintance.

4. The method, as disclosed in claim 1, said encoded key object and said encoded exchanged objects are provided with a unique and individual internal transmitting device within each said encoded key object and encoded exchanged objects and said method employs the use of a proximity reader attached to an Internet accessible device to scan and enter said unique and individual internal transmitting devices when registering said encoded key objects and said encoded exchanged objects by said host and said known friend or acquaintance.

5. The method, as disclosed in claim 1, said encoded key object and said encoded exchanged objects are provided with a a unique and individual bar code imprinted or engraved upon at least one surface and said method employs the use of a proximity reader attached to an Internet accessible device to read said bar codes to enter said unique and individual bar code when registering said encoded key objects and said encoded exchanged objects by said host and said known friend or acquaintance and a unique and individual alphanumeric code imprinted or engraved upon at least one surface for said host and said known friend or acquaintance who do not have or cannot afford a proximity reader.

6. The method, as disclosed in claim 1, wherein said carrying device is a bracelet having at least one detachable strand, said encoded key object is a bracelet clasp and said plurality of encoded exchanged objects are charms which may be placed upon said at least one detachable strand of said bracelet.

7. A method for the establishment and continued use on a secure online communication website, providing a user having an Internet access device to privately restrict communication within a registered closed network among known persons having an Internet access device, comprising:
establishing a secure online communication website, requiring restricted registration to gain access to said website and entry into a registered closed network;

purchasing a product kit by a user, designated as a host, said product kit including a unique and individually encoded key object, a plurality of unique and individual encoded exchanged objects, and a carrying device to transport said key object and plurality of encoded exchanged objects;

accessing said secure online communication website and said registered closed network on an Internet access device by said host, under adult supervision if the host is a child or minor, and entering a unique and individual code upon or within said encoded key object to activate said registered closed network;

obtaining notification by said host confirming that said closed network has been established and registered;

registering each of said unique and individual encoded exchanged objects by entering a unique and individual code upon or within each said encoded exchanged object into said registered closed network;

giving each of said pre-registered encoded exchanged objects to at least one known friend or acquaintance, under adult supervision if the host is a child or minor;

requiring each at least one said known friend or acquaintance, after receiving each said encoded exchanged object, to log onto said closed network on an Internet access device, pursuant to instructions from said host, enter a requisite entry code and register said encoded exchanged object;

sending notification by said host to said at least one known friend or acquaintance acknowledging successful registration and approved access to said closed network, wherein each said at least one known friend or acquaintance and said host may engage in secure communication within said registered closed network.

8. The method, as disclosed in claim 7, said encoded key object and said encoded exchanged objects are provided with a unique and individual alphanumeric code imprinted or engraved upon at least one surface.

9. The method, as disclosed in claim 7, said encoded key object and said encoded exchanged objects are provided with a unique and individual bar code imprinted or engraved upon at least one surface and said method employs the use of a proximity reader attached to an Internet accessible device to read said bar codes to enter said unique and individual bar code when registering said encoded key objects and said encoded exchanged objects by said host and said known friend or acquaintance.

10. The method, as disclosed in claim 7, said encoded key object and said encoded exchanged objects are provided with a unique and individual internal transmitting device within each said encoded key object and encoded exchanged objects and said method employs the use of a proximity reader attached to an Internet accessible device to scan and enter said unique and individual internal transmitting devices when registering said encoded key objects and said encoded exchanged objects by said host and said known friend or acquaintance.

11. The method, as disclosed in claim 7, said encoded key object and said encoded exchanged objects are provided with a a unique and individual bar code imprinted or engraved upon at least one surface and said method employs the use of a proximity reader attached to an Internet accessible device to read said bar codes to enter said unique and individual bar code when registering said encoded key objects and said encoded exchanged objects by said host and said known friend or acquaintance and a unique and individual alphanumeric code imprinted or engraved upon at least one surface for said host and said known friend or acquaintance who do not have or cannot afford a proximity reader.

12. The method, as disclosed in claim 7, wherein said carrying device is a bracelet having at least one detachable strand, said encoded key object is a bracelet clasp and said plurality of encoded exchanged objects are charms which may be placed upon said at least one detachable strand of said bracelet.

* * * * *